US009335166B2

(12) United States Patent
Han et al.

(10) Patent No.: US 9,335,166 B2
(45) Date of Patent: May 10, 2016

(54) APPARATUS FOR MONITORING HOT WASTE WATER DISCHARGED FROM POWER PLANT BY USING AIRBORNE MULTISPECTRAL SCANNER SYSTEM

(71) Applicant: Korea Institute of Geoscience and Mineral Resources, Yuseong-gu, Daejeon (KR)

(72) Inventors: Jong-Gyu Han, Daejeon (KR); Ki-Sung Sung, Incheon (KR); Sung-Soon Lee, Daejeon (KR); Yeong-Kwang Yeon, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 172 days.

(21) Appl. No.: 13/958,512

(22) Filed: Aug. 2, 2013

(65) Prior Publication Data

US 2014/0111806 A1    Apr. 24, 2014

(30) Foreign Application Priority Data

Oct. 22, 2012 (KR) .................. 10-2012-0117251

(51) Int. Cl.
*G01N 21/00* (2006.01)
*G01C 11/02* (2006.01)
*F17C 3/08* (2006.01)
*G01J 5/06* (2006.01)

(52) U.S. Cl.
CPC . *G01C 11/02* (2013.01); *F17C 3/08* (2013.01); *G01J 5/061* (2013.01)

(58) Field of Classification Search
CPC ............... F17C 2223/047; F17C 2221/014; F17C 3/08; G01J 5/061; G01J 3/2823; G01J 3/06; G01J 3/50
See application file for complete search history.

(56) References Cited

U.S. PATENT DOCUMENTS

| 3,468,348 | A | * | 9/1969 | Sperberg ................ B60C 5/001 137/14 |
| 3,750,414 | A | * | 8/1973 | Heftman ........................ 62/50.1 |
| 3,878,690 | A | * | 4/1975 | Bell et al. ....................... 62/49.2 |
| 4,626,063 | A |   | 12/1986 | Honey |
| 5,101,636 | A | * | 4/1992 | Lee et al. ........................ 62/48.1 |
| 5,169,031 | A | * | 12/1992 | Miller .................. B65B 31/006 222/146.5 |
| 5,276,321 | A |   | 1/1994 | Chang et al. |

(Continued)

FOREIGN PATENT DOCUMENTS

| JP | 7-35613 | 2/1995 |
| JP | 1996-501876 | 2/1996 |
| KR | 2002-0078453 | 10/2002 |

*Primary Examiner* — Michael A Lyons
*Assistant Examiner* — Maurice Smith
(74) *Attorney, Agent, or Firm* — Lewis Roca Rothgerber Christie LLP

(57) ABSTRACT

Disclosed is an apparatus for monitoring hot waste water discharged from a power plant by using an airborne multispectral scanner system. The apparatus includes a first detector including a first image data collecting unit to obtain first image data and a liquid-phase nitrogen storing tank used to cool an image obtaining sensor, a second detector including a second image data collecting unit to obtain second image data, and a liquid-phase nitrogen storing tank used to cool an image obtaining sensor, a controller to process the first and second image data obtained by the first detector and the second detector, respectively, and an auxiliary liquid-phase nitrogen tank separated from the liquid-phase nitrogen storing tank. The auxiliary liquid-phase nitrogen tank complements liquid-phase nitrogen for cooling.

11 Claims, 5 Drawing Sheets

(56) References Cited

U.S. PATENT DOCUMENTS

| | | | | |
|---|---|---|---|---|
| 5,327,729 A | * | 7/1994 | Yanai | C01B 21/04 62/47.1 |
| 5,584,971 A | * | 12/1996 | Komino | C23C 14/541 118/723 E |
| 5,661,980 A | * | 9/1997 | Gallivan | 62/51.1 |
| 2002/0065627 A1 | * | 5/2002 | Neeser et al. | 702/156 |
| 2004/0074240 A1 | * | 4/2004 | Robbie et al. | 62/50.1 |
| 2007/0177145 A1 | * | 8/2007 | Ohishi et al. | 356/328 |
| 2009/0071171 A1 | * | 3/2009 | Zia | F17C 3/00 62/47.1 |
| 2011/0314839 A1 | * | 12/2011 | Brook et al. | 62/49.1 |
| 2015/0033765 A1 | * | 2/2015 | Blalock | F17C 5/04 62/6 |

\* cited by examiner

APPARATUS FOR MONITORING HOT WASTE WATER DISCHARGED FROM POWER PLANT BY USING AIRBORNE MULTISPECTRAL SCANNER SYSTEM

CROSS-REFERENCE TO RELATED APPLICATION

This application claims the benefit under 35 U.S.A. §119 of Korean Patent Application No. 10-2012-0117251 filed on Oct. 22, 2012 in the Korean Intellectual Property Office, the entirety of which is incorporated herein by reference.

BACKGROUND OF THE INVENTION

1. Field of the Invention

The present invention relates to an apparatus for monitoring hot waste water discharged from a power plant by using an airborne multispectral scanner system. More particularly, the present invention relates to an apparatus for monitoring hot waste water discharged from a power plant and the spread situation of the hot waste water by using an airborne multispectral scanner system.

2. Description of the Related Art

A thermoelectric power plant or a nuclear power plant has used a huge amount of river water or seawater to supply cooling water, and the cooling water is discharged in a hot state, so that the cooling water flows into a river or the sea at the outside the power plant.

Since the temperature of the discharged hot water is higher than water temperature of the surrounding river or surrounding sea, the discharged hot waste water exerts an influence on the inhabited environment of existing living things in the river or sea, and a civil complaint is continuously filed due to the discharged hot waste water.

Accordingly, the spread behavior of the hot waste water discharged from the power plant must be continuously monitored. In order to monitor the hot waste water, currently, an airborne multispectral scanner system has been used.

The airborne multispectral scanner system is mounted on a fixed wing aircraft (hereinafter, aircraft) to collect and analyze thermal energy, which is emitted from the hot waste water discharged from the power plant. The airborne multispectral scanner system can monitor a broad region through one flight.

The airborne multispectral scanner system is a device to obtain and analyze an infrared image. In order to clearly obtain the infrared image, the airborne multispectral scanner system uses an image obtaining sensor operating at an extremely low temperature.

In this case, the extremely low temperature refers to a temperature in which liquid-phase nitrogen is boiled, that is, refers to a temperature corresponding to a boiling point of the liquid-phase nitrogen Recently, many devices have been developed to obtain the infrared image without the liquid-phase nitrogen. The devices are inferior to the existing airborne multispectral scanner system in terms of the resolution of the infrared image or the detection distance of the infrared image.

Accordingly, in order to obtain a precise image during the operation of the airborne multispectral scanner system, a device to cool an image obtaining sensor by using the liquid-phase nitrogen is essentially required.

As described above, the liquid-phase nitrogen is used to cool the airborne multispectral scanner system, and the airborne multispectral scanner system is cooled to about −200° C.

Therefore, the airborne multispectral scanner system must be basically provided with a tank to store liquid-phase nitrogen in order to cool the image obtaining sensor.

However, although the existing airborne multispectral scanner system is provided therein with the tank to store the liquid-phase nitrogen, since the capacity of the tank is excessively small, there is a limitation in tracking the spread behavior of the hot waste water discharged from the power plant for a long time.

For example, when the spread of the hot waste water of the power plant is preferably monitored, that is, when the spread situation of the hot waste water is preferably monitored for a sufficiently long time, that is, from a rising tide to a falling tide, or till a next rising tide or a next falling tide, the liquid-phase nitrogen is frequently completely depleted during the monitoring with the tank capacity of storing the existing liquid-phase nitrogen, so that it is impossible to monitor the spread situation of the hot waste water through one flight.

Furthermore, when taking into consideration a lost amount of liquid-phase nitrogen, which is naturally evaporated to reduce the pressure of nitrogen gas in an existing liquid-phase nitrogen storing tank, a great amount of liquid-phase nitrogen is wasted in the liquid-phase nitrogen storing tank.

In order to solve the above problem, in order to expand the capacity of the liquid-phase nitrogen storing tank embedded in the airborne multispectral scanner system, there has been suggested a scheme of providing a tank having a greater capacity by directly linking an auxiliary liquid-phase nitrogen tank with the liquid-phase nitrogen storing tank. According to the above scheme, when liquid-phase nitrogen contained in the auxiliary liquid-phase nitrogen tank is introduced into the liquid-phase nitrogen contained in the liquid-phase nitrogen storing tank, the liquid-phase nitrogens may be exploded during the mixing between the liquid-phase nitrogens. Accordingly, the above scheme is not determined as being a preferable scheme.

Meanwhile, the related art is disclosed in U.S. Pat. No. 4,626,063 (issued on Dec. 2, 1986).

SUMMARY OF THE INVENTION

The prevent invention has been made in an effort to solve the above-described problems, and an object of the present invention is to overcome the problems related to the capacity of a liquid-phase nitrogen storing tank embedded in an airborne multispectral scanner system installed in an aircraft.

In order to accomplish the above object of the present invention, there is provided an apparatus for monitoring hot waste water discharged from a power plant by using an airborne multispectral scanner system. The apparatus includes a first detector comprising a first image data collecting unit to obtain first image data by collecting a data image, which is introduced through an opening and reflected by a scanning reflector having a motor attached thereto, onto a paraboloidal reflector, and a liquid-phase nitrogen storing tank used to cool an image obtaining sensor, a second detector comprising a second image data collecting unit to obtain second image data by collecting the data image, which is introduced through an opening and reflected by the scanning reflector having a motor attached thereto, onto a paraboloidal reflector, and a liquid-phase nitrogen storing tank used to cool an image obtaining sensor, a controller to process the first and second image data obtained by the first detector and the second detector, respectively, and an auxiliary liquid-phase nitrogen tank separated from the liquid-phase nitrogen storing tank.

In this case, preferably, the liquid-phase nitrogen storing tank includes a nitrogen pressure outlet at an upper end thereof.

In addition, preferably, the auxiliary liquid-phase nitrogen tank includes a tank-body part, an auxiliary liquid-phase nitrogen tank stopper installed at an upper portion of the tank-body part, a pipe provided at a center of the auxiliary liquid-phase nitrogen tank stopper to extend downward from a cementer of the a tank-body part, a controller embedded in the auxiliary liquid-phase nitrogen tank stopper, and an external extension tube formed at a lateral side of the auxiliary liquid-phase nitrogen tank stopper.

In addition, the auxiliary liquid-phase nitrogen tank may further include first and second valves controlled by the controller, and an air hole. The external extension tube is closed or open under a control of the second valve.

Further, preferably, the air hole is used to supply external air by pressing the external air, and the pressing and supplying of the external air are performed by controlling an air pump, the first valve, and the second valve by the controller.

In addition, preferably, the external extension tube is provided at an outlet of the second valve and coupled with the liquid-phase nitrogen storing tank.

In addition, the apparatus may further include a liquid-phase nitrogen storing tank stopper installed at an upper end of the liquid-phase nitrogen storing tank.

Further, preferably, the liquid-phase nitrogen storing tank stopper includes an auxiliary liquid-phase nitrogen inflowing pipe extending downward through a center of the liquid-phase nitrogen storing tank stopper, a plug at an upper end of the auxiliary liquid-phase nitrogen inflowing pipe, a liquid-phase nitrogen inflowing part formed at a lateral side of the auxiliary liquid-phase nitrogen inflowing pipe, an anti-liquid-phase nitrogen outflow valve formed at an entrance of the liquid-phase nitrogen inflowing part, and a level measuring sensor positioned on a lower end of the liquid-phase nitrogen storing tank stopper.

In addition, preferably, the plug is loosely coupled with the auxiliary liquid-phase nitrogen inflowing pipe.

In addition, preferably, the level measuring sensor operates by using an ultrasonic wave pr or a float.

Further, the auxiliary liquid-phase nitrogen inflowing pipe may extend to ⅔ of a height of the liquid-phase nitrogen storing tank.

As described above, according to the present invention, since a hot waste water discharged from a power plant can be monitored for a long time, data required to monitor the hot waste water discharged from the power plant can be ensured through one flight. Accordingly, since the repetition of taking-off and landing of the aircraft is not required, the working time and the wasted fuel can be reduced.

DETAILED DESCRIPTION OF THE INVENTION

The advantages, the features, and schemes of achieving the advantages and features of the present invention will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The present invention is only defined within the scope of accompanying claims.

Hereinafter, an apparatus for monitoring hot waste water discharged from a power plant by using an airborne multispectral scanner system according to an exemplary embodiment of the present invention will be described in detail with respect to accompanying drawings.

Figure 1:
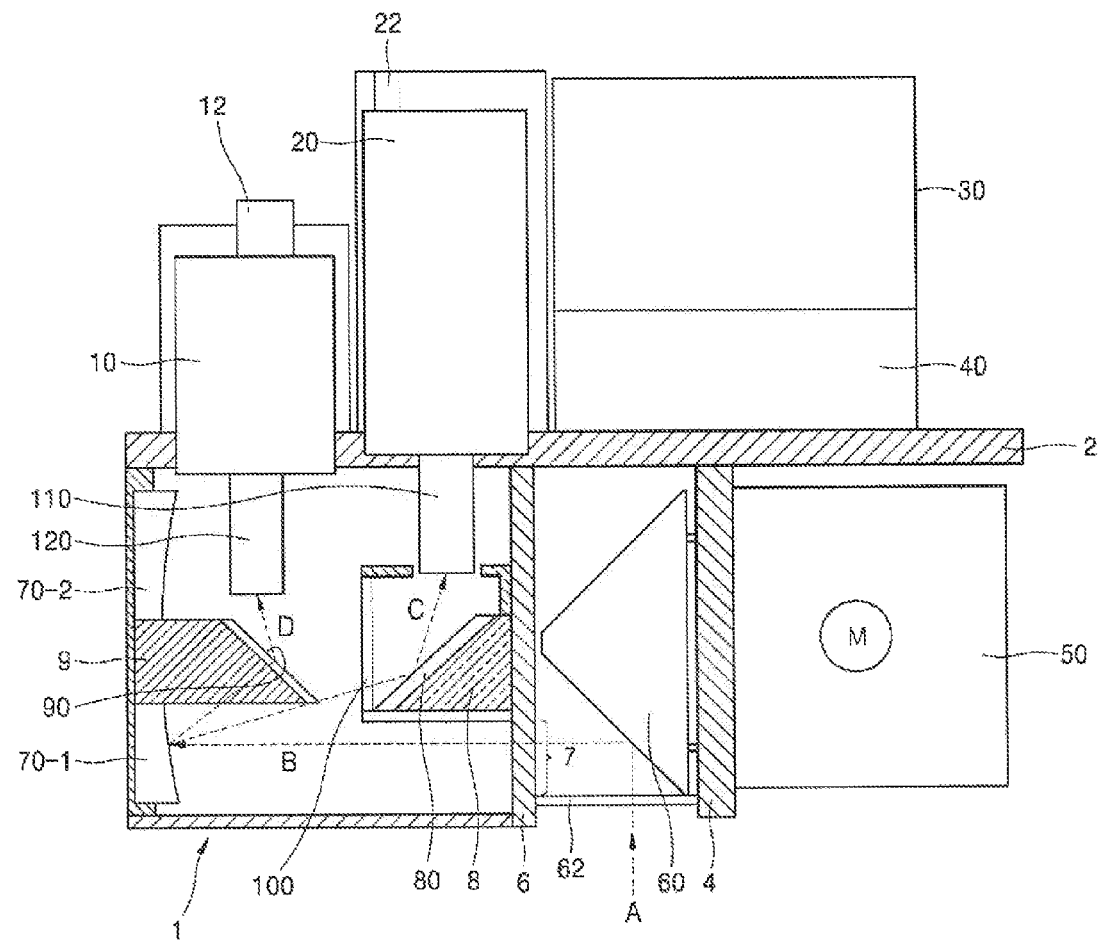
FIG. 1 is a schematic view showing an airborne multispectral scanner system according to an exemplary embodiment of the present invention.

FIG. 1 is a schematic view showing an airborne multispectral scanner system according to an exemplary embodiment of the present invention.

As recognized from FIG. 1, an airborne multispectral scanner system includes a first detector 10, a second detector 20, a gyroscope 30, and a controller 40 arranged from the left of FIG. 1 about a mount 2, and includes a motor 50, a scanning reflector 60, a paraboloidal reflector 70 including parts 70-1 and 70-2, a first reflector 80, a second reflector 90, a diachronic mirror 100, a first image data collecting unit 110, and a second image data collecting unit 120 arranged from the right of FIG. 1 under the mount 2.

In this case, preferably, the paraboloidal reflector 70 including the parts 70-1 and 70-2, the first reflector 80, the second reflector 90, and diachronic mirror 100 are sealed in a housing 1 to protect them from the inflow of dust.

In addition, preferably, even the scanning reflector 60 is sealed so that the scanning reflector 60 may be protected from the inflow of external dust.

Hereinafter, the operating principle of the airborne multispectral scanner system will be described.

Multi-frequency spectrum image data A input through an opening 62 are reflected by the scanning reflector 90 rotating together with the rotation of the motor 50 fixed to a first vertical support 4 and reflected toward the paraboloidal reflector 70 through a transparent window 7 provided in a second vertical support 6.

The paraboloidal reflector 70 forms multi-frequency spectrum image data B by focusing (concentrating) the multi-frequency spectrum image data A on a virtual focal point. Multi-frequency spectrum image data B are reflected by the first reflector 80 attached to a first reflector support 8, pass through the diachronic mirror 100, and are transmitted to the first image data collecting unit 110 in the form of multi-frequency spectrum image data C.

The diachronic mirror 100 is a mirror having a characteristic to allow a portion of the image data B to pass therethrough, and to reflect a portion of the image data B.

The multi-frequency spectrum image data C are converted into an electrical signal in a first multi-frequency spectrum image obtaining sensor (not shown) constituting the first image data collecting unit 110.

Preferably, the electrical signal is a horizontal component of the multi-frequency spectrum image.

Meanwhile, a portion of the multi-frequency spectrum image data B, which have been reflected by the paraboloidal reflector 70, is reflected by the diachronic mirror 100 attached to the second reflector support 9 toward, the second reflector 90.

Multi-frequency spectrum image data D, which have been transmitted to the second reflector 90, are transmitted to the second image data collecting unit 120. Similarly to the conversion in the first image data collecting unit 110, the multi-frequency spectrum image D is converted into an electrical signal by a second multi-frequency spectrum image obtaining sensor (not shown) constituting the second image data collecting unit 120.

In this case, preferably, the converted electrical signal is a vertical component of the multi-frequency spectrum image.

Images corresponding to the first infrared component and the second infrared component obtained from the first image data collecting unit 110 and the second image data collecting unit 120 are interpreted and analyzed through the controller 40, and finally converted so that the converted images may be displayed on a monitor (not shown).

In other words, preferably, the controller 40 has a data processing function.

The image data, which are obtained through the final conversion, may be stored in a memory device, preferably in a mass storage tape recording device, more preferably a hard disc.

In addition, the data stored in the hard disc may be subject to a post-treatment process after the aircraft returns to the ground.

The multi-frequency spectrum image obtaining sensors (not shown) constituting the image data collecting unit 110 and the second image data collecting unit 120 are cooled at an extremely low temperature by using liquid-phase nitrogen.

To this end, each of the first image data collecting unit 110 and the second image data collecting unit 120 further includes a liquid-phase nitrogen storing tank containing the liquid-phase nitrogen.

Alternatively, a liquid-phase nitrogen storing tank to commonly cool the first image data collecting unit 110 and the second image data collecting unit 120 may be installed, so that the first image data collecting unit 110, and the second image data collecting unit 120 may be simultaneously cooled.

The nitrogen pressure outlet 12 is formed on an upper end of the first detector 10. Identically, a nitrogen pressure outlet 22 is formed on an upper end of the second detector 20.

The nitrogen pressure outlet 12 and 22 are used to discharge gas-phase nitrogen naturally evaporated from the liquid-phase nitrogen storing tanks provided in the first detector 10 and the second detector 20. The nitrogen pressure outlet 12 and 22 are loosely configured to the extent that the liquid-phase nitrogen contained in the first and second detectors 10 and 20 may be prevented from flowing out, and the nitrogen gas evaporated from the liquid-phase nitrogen storing tank may be discharged to the outside.

Meanwhile, in FIG. 1, reference number 30 represents a gyroscope device. The gyroscope device may not be installed because most aircrafts have the gyroscope device.

Figure 2:
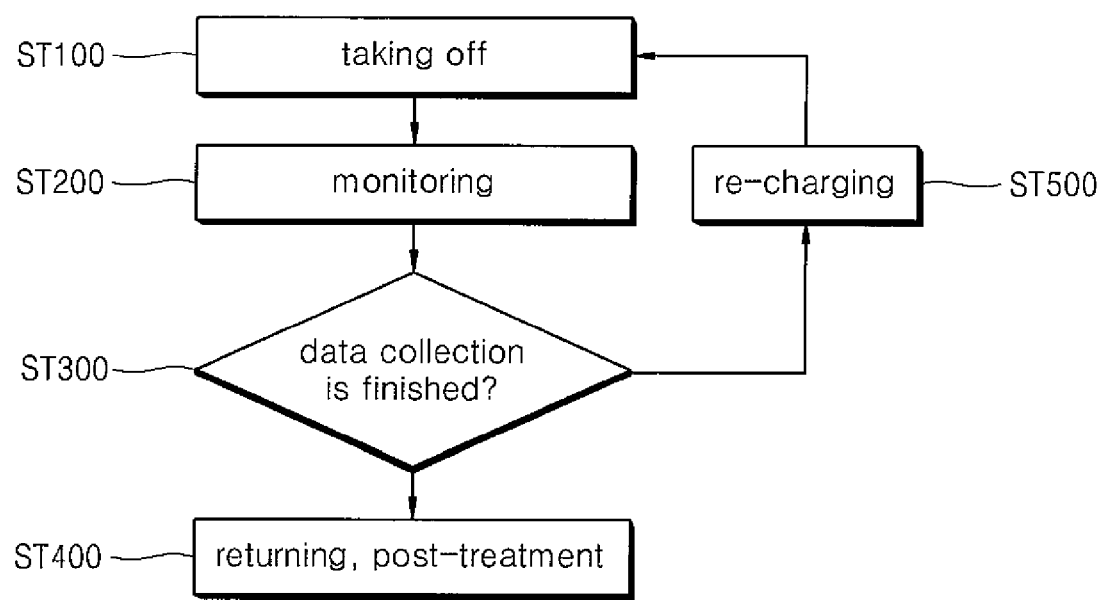
FIG. 2 is a flowchart schematically showing the monitoring sequence through an apparatus for monitoring hot waste water discharged from a power plant by using an airborne multispectral scanner system according to the exemplary embodiment of the present invention.

FIG. 2 is a flowchart schematically showing the monitoring sequence by using the apparatus for monitoring the hot waste water discharged from the power plant by using an airborne multispectral scanner system As recognized from FIG. 2, the monitoring of the hot waste water discharged from the power plant includes step ST100 of taking off an aircraft (not shown) after mounting the airborne multispectral scanner system on the aircraft, step ST200 of starting the monitoring when the aircraft reaches a destination in the sky, step ST300 of checking data collection termination after the monitoring has been finished, and step ST400 of allowing the aircraft to return to the ground after a sufficient amount of data has been collected, so that the data are subject to the post-treatment or the post-process, thereby finishing the monitoring work of the hot waste water discharged from the power plant.

However, if a great amount of time is unexpectedly taken to collect data since the area to be monitored is broad, or if time required for the monitoring work is prolonged for other reasons, the liquid-phase nitrogen for cooling may be depleted.

In this case, since the image obtaining sensor (not shown) is not sufficiently cooled during the monitoring work of the hot waste water discharged from the power plant, the monitoring work cannot be completely finished. Accordingly, the aircraft must be landed on the ground, subject to step ST500 of charging the fuel for the aircraft and the liquid-phase nitrogen again, and taken off so that the aircraft subsequently performs the monitoring work.

In this case, since the time is significantly wasted not only for the taking-off/landing of the aircraft, but also for the re-supply of the fuel or for the re-charging of the liquid-phase nitrogen, it is not preferred that the taking-off/landing frequently occurs.

Therefore, in order to continuously maintain the cooling of the image obtaining sensor, the auxiliary liquid-phase nitrogen tank is preferably provided.

Figure 3:
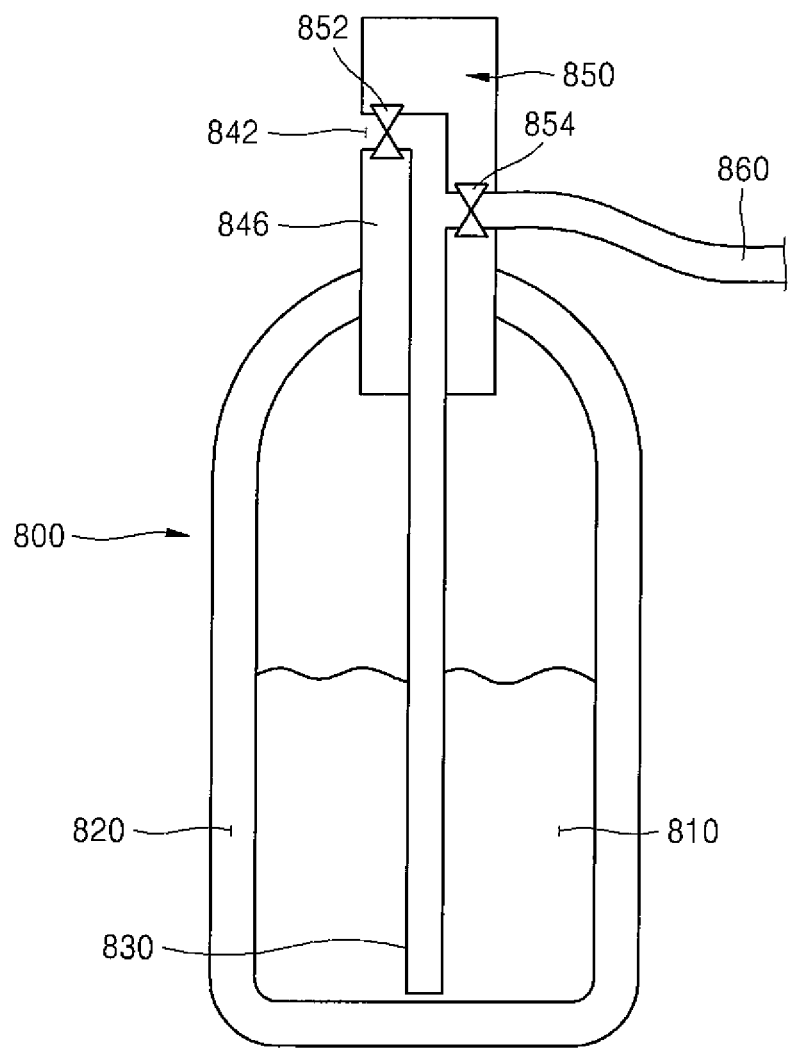
FIG. 3 is a sectional view schematically showing an auxiliary liquid-phase nitrogen tank included in the apparatus for monitoring the hot waste water discharged from the power plant by using the airborne multispectral scanner system according to the exemplary embodiment of the present invention.

FIG. 3 is a sectional view schematically showing the auxiliary liquid-phase nitrogen tank 800 included in the apparatus for monitoring the hot waste water discharged from the power plant by using the airborne multispectral scanner system according to the exemplar embodiment.

Hereinafter, the description of the structure of the auxiliary liquid-phase nitrogen tank 800 of FIG. 3 will be made after the description of the background of the present invention of FIG. 3.

As described above, the liquid-phase nitrogen not only may be exploded, but also the liquid-phase nitrogen drops may be sprung out when the liquid-phase nitrogen outflows so that the liquid-phase nitrogen is dropped on the ground. Accordingly, it is very dangerous that the auxiliary liquid-phase nitrogen tank 800 is inclined or the stopper of the auxiliary liquid-phase nitrogen tank 800 is open and then the liquid-phase nitrogen in the auxiliary liquid-phase nitrogen tank 800 is delivered by using a ladle (not shown) or a funnel (not shown).

Accordingly, the present invention is designed to safely deliver the liquid-phase nitrogen to the first image data collecting unit 110 and the second image data collecting unit 120 from the auxiliary liquid-phase nitrogen tank 800.

Hereinafter, the structure in which the liquid-phase nitrogen is safely delivered from the auxiliary liquid phase nitrogen tank 800 will be described.

As shown in FIG. 3, the auxiliary liquid-phase nitrogen tank 800 includes a liquid-phase nitrogen 810, a tank-body part 820, a pipe 830 to deliver liquid-phase nitrogen to the outside, the auxiliary liquid-phase nitrogen tank stopper 840, a controller 850 embedded in the auxiliary liquid-phase nitrogen tank stopper 840, a first valve 852 and a second valve 854 controlled by the controller 850, and an external extension tube 860.

Preferably, the tank-body part 820 preferably has a hollow shape having a vacuum state therein. If the hollow structure is formed, the natural evaporation of the liquid-phase nitrogen may be more reduced.

Next, preferably, the pipe 830 to move the liquid-phase nitrogen to the outside is inserted into the center of the auxiliary liquid-phase nitrogen tank stopper 840, and extends downward substantially to the bottom of the auxiliary liquid-phase nitrogen tank 800.

The auxiliary liquid-phase nitrogen tank stopper 840 prevents the liquid-phase nitrogen 810, which is stored in the auxiliary liquid-phase nitrogen tank 800, from being overflown.

In addition, preferably, a nitrogen pressure outlet 842 is additionally formed at one lateral side of the auxiliary liquid-phase nitrogen tank stopper 840.

In this case, the opening of the nitrogen pressure outlet 842 is loosely closed by a plug (not shown), so that the liquid-phase nitrogen 810 is slightly discharged to the outside.

In this case, more preferably, the first valve 852 is open by the controller 850 when the liquid-phase nitrogen 810 is not complemented, and closed by the controller 850 when the liquid-phase nitrogen 810 must be complemented.

In this case, the controller 850 embedded in the auxiliary liquid-phase nitrogen tank stopper 840 applies an air pressure to the liquid-phase nitrogen 810. The detailed structure of applying the air pressure to the liquid-phase nitrogen 810 will be described later with reference to FIG. 4.

As described above, the external extension tube 860 allows the liquid-phase nitrogen 810 pressed by the air pressure to outflow. The external extension tube 860 may be formed at an outside of the second valve 854.

The external extension tube 860 extends with a sufficient length from the auxiliary liquid-phase nitrogen tank 800. Preferably, the external extension tube 860 is provided in the form of a flexible tube so that the external extension tube 860 can extend to the nitrogen pressure outlets 12 and 22 of the first image data collecting unit 110 and the second image data collecting unit 120.

Although not shown, the external extension tube 860 may further include a liquid-phase nitrogen flowmeter to measure the total flow amount of the liquid-phase nitrogen 810 outflowing from the auxiliary liquid-phase nitrogen tank 800.

If the liquid-phase nitrogen flowmeter is provided, the total flow amount of the liquid-phase nitrogen 810 outflowing from the auxiliary liquid-phase nitrogen tank 800 can be detected.

Accordingly, an amount of liquid-phase nitrogen inflowing to the liquid-phase nitrogen storing tank can be comprehended.

Figure 4:
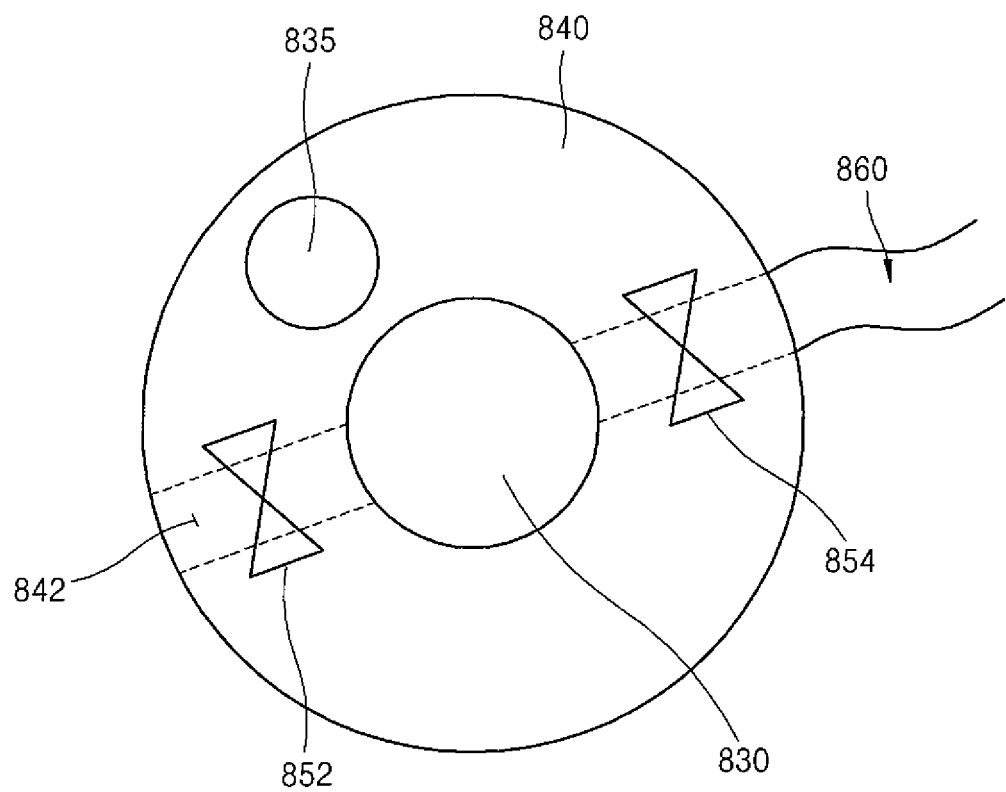
FIG. 4 is a plan view schematically showing a stopper formed at an upper portion of the auxiliary liquid-phase nitrogen tank according to the exemplary embodiment of the present invention.

FIG. 4 is a plan view schematically showing a stopper formed on the auxiliary liquid-phase nitrogen tank according to the according to the exemplary embodiment of the present invention.

As described with reference to FIG. 3, the auxiliary liquid-phase nitrogen tank stopper 840 includes the pipe 830 allowing the liquid-phase nitrogen to outflow, an air hole 835 to introduce external air, and a first valve 852 and a second valve 854 controlled by the controller 850. The auxiliary liquid-phase nitrogen tank stopper 840 further includes the nitrogen pressure outlet 842 and the external extension tube 860

The air hole 835 is used to press the liquid-phase nitrogen 810 into the auxiliary liquid-phase nitrogen tank 800 by pressing external air.

When the air pressure is applied to the liquid-phase nitrogen 810, the second valve 854 is open, and then the first valve 852 is closed. Thereafter, an air pump (not shown) formed in the air hole 835 operates under the control of the controller 850, so that the external air is pressed and supplied to the auxiliary liquid-phase nitrogen tank 800 through the air hole 835.

Accordingly, the external air, which is pressed and supplied, presses the top surface of the liquid-phase nitrogen 810 provided in the auxiliary liquid-phase nitrogen tank 800, so that the flow of the liquid-phase nitrogen 810 is generated from the bottom to the top of the pipe 83, which allows the liquid-phase nitrogen 810 to flow out, that is, the flow of the liquid-phase nitrogen 810 is generated toward the auxiliary liquid-phase nitrogen tank stopper 840.

The flow of the liquid-phase nitrogen 810 is made toward the external extension tube 860 through the closed first valve 852 and the open second valve 854.

As described above, according to the scheme of pressing and supplying the external air, since the external air pushes only the top surface of liquid-phase nitrogen while slowly pressing, the liquid-phase nitrogen can be prevented from rapidly flowing, so that the problem related to the safety can be remarkably reduced.

If a determination that a required amount of liquid-phase nitrogen is supplied is made, the pressing of the air pressure through the air hole 835 is stopped, and the first valve 852 is open. Then, the second valve 854 is closed, so that the procedure of supplying the liquid-phase nitrogen is finished.

Meanwhile, although accompanying drawings show that the first valve 852 and the second valve 854 are provided in opposition to each other, the present invention is not limited thereto.

Similarly, the pipe 830 and the air hole 835 may have various sizes or various positions.

Figure 5:
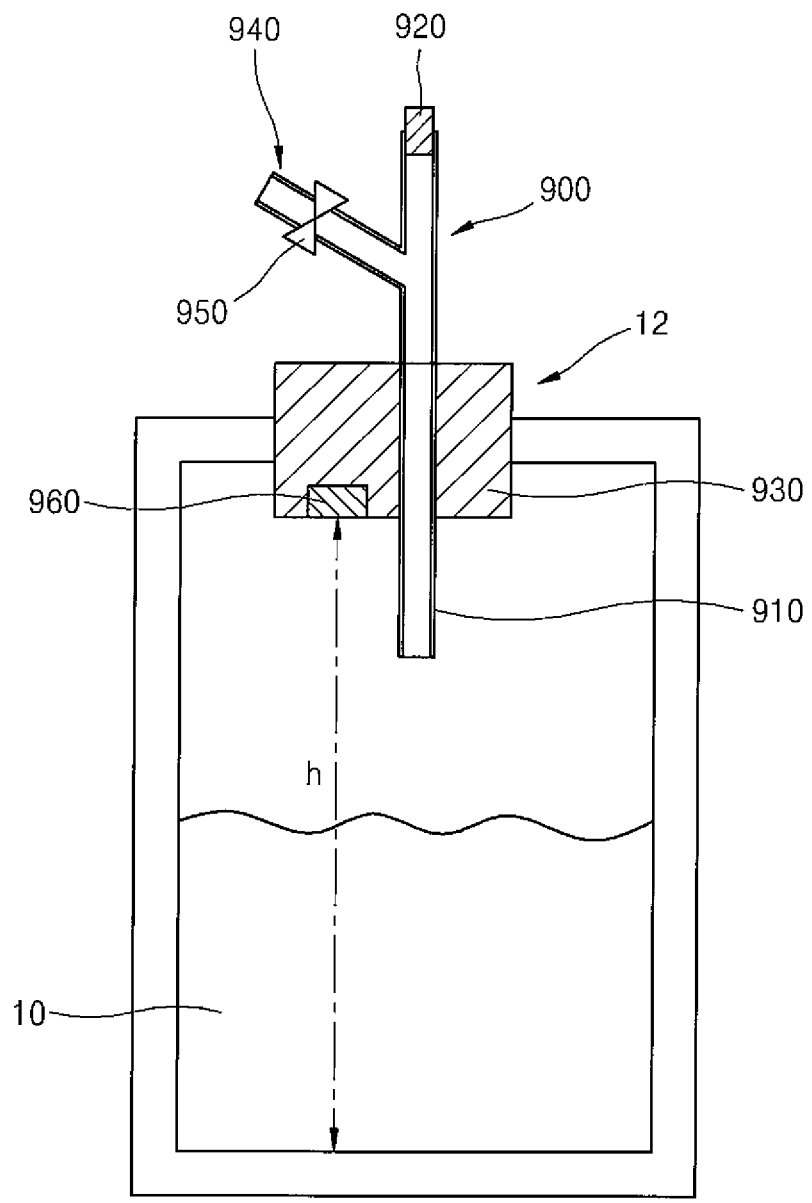
FIG. 5 is a sectional view schematically showing a liquid-phase nitrogen storing tank and a nitrogen pressure outlet according to the exemplary embodiment of the present invention.

Finally, FIG. 5 is a schematic view illustrating a liquid-phase nitrogen storing tank and a nitrogen pressure outlet according to an exemplary embodiment of the present invention.

Although FIG. 5 shows only the nitrogen pressure outlet 12, the nitrogen pressure outlet 22 may be actually structured. In addition, as described above, the nitrogen pressure outlets 12 and 22 are integrally provided with each other.

In FIG. 5, an auxiliary liquid-phase nitrogen inflowing part 900 includes a liquid-phase nitrogen storing tank stopper 930 provided on the upper end of the first detector 10, an auxiliary liquid-phase nitrogen inflowing pipe 910 provided in the liquid-phase nitrogen storing tank stopper 930, a plug 920 loosely inserted into the upper end of the auxiliary liquid-phase nitrogen inflowing pipe 910, an inflowing part 940 coupled with the external extension tube 860, an anti-liquid-phase nitrogen outflow valve 950 provided at the entrance of the inflowing part 940, and a level measuring sensor 960 provided on the bottom of the liquid-phase nitrogen storing tank stopper 930.

The auxiliary liquid-phase nitrogen inflowing pipe 910 is a pipe extending to the inner part of the first detector 10 through the center of the liquid-phase nitrogen storing tank stopper 930.

Preferably, the auxiliary liquid-phase nitrogen inflowing pipe 910 is inserted to the depth of about ⅔ of the depth of the first detector 10 so that the least influence can be exerted on the auxiliary liquid-phase nitrogen inflowing pipe 910 by the flow of air bubbles.

The plug 920 is loosely inserted into the upper end of the auxiliary liquid-phase nitrogen inflowing pipe 910 to allow the naturally-evaporated liquid-phase nitrogen to flow out.

The inflowing part 940 is coupled with the external extension tube 860. Preferably, the inflowing part 940 is loosely coupled with the external extension tube 860 for the safety.

In this case, the anti-liquid-phase nitrogen outflow valve 950 prevents the liquid-phase nitrogen from unexpectedly flowing out to the inflowing part 940 through the auxiliary liquid-phase nitrogen inflowing pipe 910.

Finally, preferably, the level measuring sensor 960 is provided on the bottom of the liquid-phase nitrogen storing tank stopper 930.

In the state that the height of the nitrogen filled in the first detector 10 is recognized, the level measuring sensor 960 measures the level of the liquid-phase nitrogen. Preferably, the level measuring sensor 960 operates in an ultrasonic wave scheme.

In detail, after applying an ultrasonic wave to the bottom of the first detector 10, the level measuring sensor 960 measures time taken until the ultrasonic wave is reflected from the bottom, thereby checking an amount of the liquid-phase nitrogen.

Alternatively, instead of measuring the level of the liquid-phase nitrogen by providing the level measuring sensor 960 in the liquid-phase nitrogen storing tank stopper 930, the level of the liquid-phase nitrogen may be measured by using a float floating on the surface of the liquid-phase nitrogen. In addition, the level of the liquid-phase nitrogen may be measured by using a float which is movable up and down and attached on the outer surface of the auxiliary liquid-phase nitrogen inflowing pipe 910.

In this case, based on the checked amount of the liquid-phase nitrogen, or the checked level of the liquid-phase nitrogen, an amount of liquid-phase nitrogen supplied from the auxiliary liquid-phase nitrogen tank 800 through the external extension tube 860 can be suitably controlled.

If a determination that a required amount of liquid-phase nitrogen is supplied is made, the level measuring sensor 960 sends a signal of informing the controller 850 of that the liquid-phase nitrogen has been sufficiently supplied. Thereafter, as described above, the pressing of the air pressure through the air hole 835 is stopped, the first valve 852 is open, and the second valve 854 is closed, thereby finishing the procedure of supplying the liquid-phase nitrogen.

Meanwhile, the level measuring sensor 960 detects the situation that the liquid-phase nitrogen is used up, that is, the situation that the liquid-phase nitrogen is used up while cooling the first detector 10 and/or second detector 20. Simultaneously, if a predetermined condition, in which, for example, the liquid-phase nitrogen is reduced to less than half a depth of the first detector 10 and/or second detector 20, is satisfied, the controller 850 of the auxiliary liquid-phase nitrogen tank 800 is preferably driven so that the liquid-phase nitrogen 810 provided within the auxiliary liquid-phase nitrogen tank 800 is additionally supplied.

For reference, according to the present invention, the apparatus for monitoring the hot waste water discharged from the power plant by using the airborne multispectral scanner system not only can be used to monitor the hot waste water discharged from the power plant, but also can be used to monitor the behavior of a heat source such as a forest fire, which may be rapidly spread out, or a hot spring which may be measured by an infrared light.

Although an apparatus for monitoring hot waste water discharged from a power plant by using an airborne multispectral scanner system according to the exemplary embodiments of the present invention have been described for the illustrative purpose, it is understood that the present invention should not be limited to these exemplary embodiments but various changes, modifications, equivalents can be made by one ordinary skilled in the art within the spirit and scope of the present invention as hereinafter claimed.

What is claimed is:

1. An apparatus for monitoring hot waste water discharged from a power plant by using an airborne multispectral scanner system, the apparatus comprising:
   a first detector comprising a first image data collector comprising a first image obtaining sensor to obtain first image data by collecting a data image, which is introduced through an opening and reflected by a scanning reflector having a motor attached thereto, onto a paraboloidal reflector, and a first liquid-phase nitrogen storing tank used to cool the first image obtaining sensor;
   a second detector comprising a second image data collector comprising a second image obtaining sensor to obtain second image data by collecting the data image, which is introduced through the opening and reflected by the scanning reflector having the motor attached thereto, onto the paraboloidal reflector, and a second liquid-phase nitrogen storing tank used to cool the second image obtaining sensor;
   a controller to process the first and second image data obtained by the first detector and the second detector, respectively; and
   an auxiliary liquid-phase nitrogen tank separated from the first and second liquid-phase nitrogen storing tanks,
   wherein a first nitrogen pressure outlet is formed on an upper end of the first detector, and a second nitrogen pressure outlet is formed on an upper end of the second detector, and
   wherein the first and the second nitrogen pressure outlets are loosely closed by a plug, so that the liquid-phase nitrogen contained in the first and second detectors is prevented from flowing out and nitrogen gas evaporated from the first and second liquid-phase nitrogen storing tanks is discharged to the outside.

2. The apparatus of claim 1, wherein the auxiliary liquid-phase nitrogen tank comprises:
   a tank-body part;
   an auxiliary liquid-phase nitrogen tank stopper installed at an upper portion of the tank-body part;
   a pipe provided at a center of the auxiliary liquid-phase nitrogen tank stopper to extend downward from a cementer of the tank-body part;
   a controller embedded in the auxiliary liquid-phase nitrogen tank stopper; and
   an external extension tube formed at a lateral side of the auxiliary liquid-phase nitrogen tank stopper.

3. The apparatus of claim 2, wherein the auxiliary liquid-phase nitrogen tank further comprises:
   first and second valves controlled by the controller; and
   an air hole, and
   wherein the external extension tube is closed or open under a control of the second valve.

4. The apparatus of claim 3, wherein the air hole is used to supply external air by pressing the external air, and the pressing and supplying of the external air are performed by controlling an air pump, the first valve, and the second valve by the controller.

5. The apparatus of claim 3, wherein the external extension tube is provided at an outlet of the second valve and coupled with the first and second liquid-phase nitrogen storing tanks.

6. The apparatus of claim 1, further comprising a liquid-phase nitrogen storing tank stopper installed at an upper end of each of the first and second liquid-phase nitrogen storing tanks.

7. The apparatus of claim 6, wherein each of the liquid-phase nitrogen storing tank stoppers comprises:
- an auxiliary liquid-phase nitrogen inflowing pipe extending downward through a center of the liquid-phase nitrogen storing tank stopper;
- a plug at an upper end of the auxiliary liquid-phase nitrogen inflowing pipe;
- a liquid-phase nitrogen inflowing part formed at a lateral side of the auxiliary liquid-phase nitrogen inflowing pipe;
- an anti-liquid-phase nitrogen outflow valve formed at an entrance of the liquid-phase nitrogen inflowing part; and
- a level measuring sensor positioned on a lower end of the liquid-phase nitrogen storing tank stopper.

8. The apparatus of claim 7, wherein the plug is loosely coupled with the auxiliary liquid-phase nitrogen inflowing pipe.

9. The apparatus of claim 7, wherein the level measuring sensor operates by using an ultrasonic wave.

10. The apparatus of claim 7, wherein the level measuring sensor operates by using a float.

11. The apparatus of claim 7, wherein the auxiliary liquid-phase nitrogen inflowing pipe extends to ⅔ of a height of the liquid-phase nitrogen storing tank.

\* \* \* \* \*